United States Patent [19]

Yamashita et al.

[11] Patent Number: 4,493,103

[45] Date of Patent: Jan. 8, 1985

[54] AUTOMATIC TOLL-TICKET ISSUING APPARATUS

[75] Inventors: Riichiro Yamashita, Takasago; Osamu Satonishi, Kobe, both of Japan

[73] Assignee: Mitsubishi Jukogyo Kabushiki Kaisha

[21] Appl. No.: 371,246

[22] Filed: Apr. 23, 1982

[30] Foreign Application Priority Data

Apr. 28, 1981 [JP] Japan .................................. 56-64732

May 13, 1981 [JP] Japan .................................. 56-71765

[51] Int. Cl.[3] .......................... G08G 1/00; G06K 9/00

[52] U.S. Cl. .......................................... 382/1; 235/384; 340/942

[58] Field of Search .................... 382/1; 364/436, 464, 364/424; 340/933, 942, 988, 51; 235/384, 449, 475, 476, 486, 493

[56] References Cited

U.S. PATENT DOCUMENTS 2,769,165 10/1956 Bower ................................ 340/942

3,705,976 12/1972 Platzman ............................ 235/384

3,794,966 2/1974 Platzman ............................ 340/942

4,288,688 9/1981 Kiyama et al. ...................... 235/384

4,303,904 12/1981 Chasek ............................... 235/384

FOREIGN PATENT DOCUMENTS 11940 4/1976 Japan .

123315 3/1978 Japan .

OTHER PUBLICATIONS

Hauslen, "The Promise of Automatic Vehicle Identification", *IEEE Trans. on Vehicular Tech.*, vol. VT-26, No. 1, pp. 30-38, Feb. 1977.

*Primary Examiner*—Leo H. Boudreau

*Attorney, Agent, or Firm*—Toren, McGeady and Stanger

[57] ABSTRACT

An automatic toll-ticket issuing apparatus includes a vehicle-type identification unit for identifying the type of each oncoming vehicle, a toll-ticket issuing unit installed ahead of the identification unit along the vehicle path, and a vehicle-start detector installed farther ahead of the issuing unit. The toll-ticket issuing unit has a plurality of toll-ticket issuing slots open at different heights, and it holds a stack of new, unused toll tickets. Further, the issuing unit can feed the tickets one by one out of a hopper, and it can record the vehicle-type information, interchange number, and other necessary information on each ticket being fed. The recorded tickets are sequentially transported each to an issuing slot at the height determined in response to the vehicle-type information from the vehicle-type identification unit, and any ticket left unpulled from any issuing slot by any driver can be retrieved in response to vehicle passage information.

6 Claims, 7 Drawing Figures

AUTOMATIC TOLL-TICKET ISSUING APPARATUS

BACKGROUND OF THE INVENTION

This invention relates to an automatic toll-ticket issuing apparatus to be installed beside an entrance gate of a toll road or expressway to provide, without human assistance, each driver with a toll ticket for subsequent toll collection at the destination exit.

A conventional practice for the fee collection on a toll road or expressway, for example in the case of a multi-zone turnpike system, has been for the tollman at the entrance gate to identify each oncoming vehicle visually, press the button of a ticket-issuing unit corresponding to the classification or type of the vehicle, and then the machine issues a toll card or ticket CD, as shown in FIG. 1, printed with the type number of the particular vehicle, number of the interchange into which the vehicle is entering, month-day-hour-minute of entry, tollman number, serial number of the ticket, and other information required. The ticket also has a magnetic stripe MS on which the vehicle type No., interchange No., month-day-hour-minute, tollman No., registration No. of the vehicle (on the license plate), number of the vehicle's axles, etc. have been magnetically recorded. At the exit gate of the destination zone the vehicle is leaving, the toll collector receives the ticket from the driver and passes it through a ticket reader, which in turn reads the vehicle type No. and the origin-interchange No. and automatically computes the exact amount of toll to be charged.

The toll-ticket reader, as schematically illustrated in FIG. 2, is a terminal of a centralized computer system for the toll road or expressway, combining two functions of issuing new toll tickets and reading the data on used tickets. The reader comprises a rotary conveying drum D around which three magnetic heads 1, 1', 1" for writing on, or reading from, the magnetic stripe MS of each toll ticket CD and a printer head 2 for printing necessary information on a printable zone of the ticket CD are located opposite to the drum surface and close to one another. A main conveying part 3 for transporting tickets CD to be handled is formed by extending a belt B around the drum with the aid of pulleys P, thus keeping the belt in contact with the drum surface. Near the inlet side of this main conveying part 3, there is provided a ticket hopper 4 for holding a fresh supply of toll tickets CD. An insertion slot 5 for manually introducing each new toll ticket CD into the apparatus is provided in the vicinity of the ticket hopper 4. The slot 5 and the hopper 4 have, respectively, auxiliary conveying sections 6, 6' for guiding tickets toward the main conveying part 3. The auxiliary sections are equipped with means for supplying or delivering tickets to the main conveying part of the apparatus.

On the outlet side of the main conveying part 3 are provided a stacker 7 for retrieving used tickets CD and a discharge slot 8, both connected with the main conveying part 3 through auxiliary conveying sections 9, 9', respectively.

Between the main conveying part 3 and the auxiliary conveying sections 9, 9' is disposed a flapper FP for sorting tickets into the auxiliary conveying routes.

In the conventional apparatus of the construction described, a used toll ticket CD is manually introduced from the insertion slot 5 into the main conveying part 3, where the ticket is held securely between the rotating drum D and the belt B and is transported toward the outlet. During this travel, the magnetic stripe MS of the ticket comes into contact, in succession, with the magnetic heads 1, 1', 1", where the magnetically recorded information is read out. A space SP reserved for printing on the toll ticket CD is printed, when necessary, with some additional data by the printer head 2. The ticket is then sorted by the flapper FP for delivery to either the stacker 7 or the discharge slot 8.

When the apparatus is to be used as a toll ticket-issuing unit, each new ticket CD is taken out of the hopper 4 and is transported through the main conveying part 3. During the travel, necessary information is written on, or read from, the magnetic stripe MS of the ticket by the magnetic heads 1, 1', 1" and additional information is printed and recorded on the space SP by the printer head 2. If the recorded information in the magnetic stripe MS is correct, the ticket CD is directed by the flapper FP to the discharge slot 8 and if erroneous, the ticket is retrieved by the stacker 7.

The apparatus of the prior art requires manual operation, such as keying or depression of a vehicle-type button, to issue tickets and recognize the information thereon, and presents a problem of impossibility of unattended operation.

SUMMARY OF THE INVENTION

The present invention has been perfected in view of the above, and has for an object to provide an automatic toll-ticket issuing apparatus in which the issuing unit is operatively connected with a vehicle-type identification unit and a vehicle-start detector to issue toll tickets automatically from slots at different heights according to the types of vehicles, each slot being equipped with a temporary holding mechanism to avoid issuing two or more tickets to the same vehicle, and to retrieve any ticket left unpulled by a driver who has proceeded without the ticket and prevent issuing the same ticket to the driver of the following vehicle but issuing the proper ticket to the latter automatically with high speed and accuracy.

Another object of the invention is to provide an automatic toll-ticket issuing apparatus which is equipped with a standby issuing mechanism to put out toll tickets in very rapid succession when a bunch of vehicles are to pass the tollgate.

DETAILED DESCRIPTION OF THE INVENTION

Figure 1:
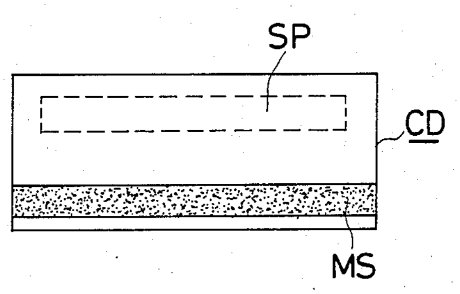
FIG. 1 is a plan view of a toll ticket of a magnetically recording type.
Figure 2:
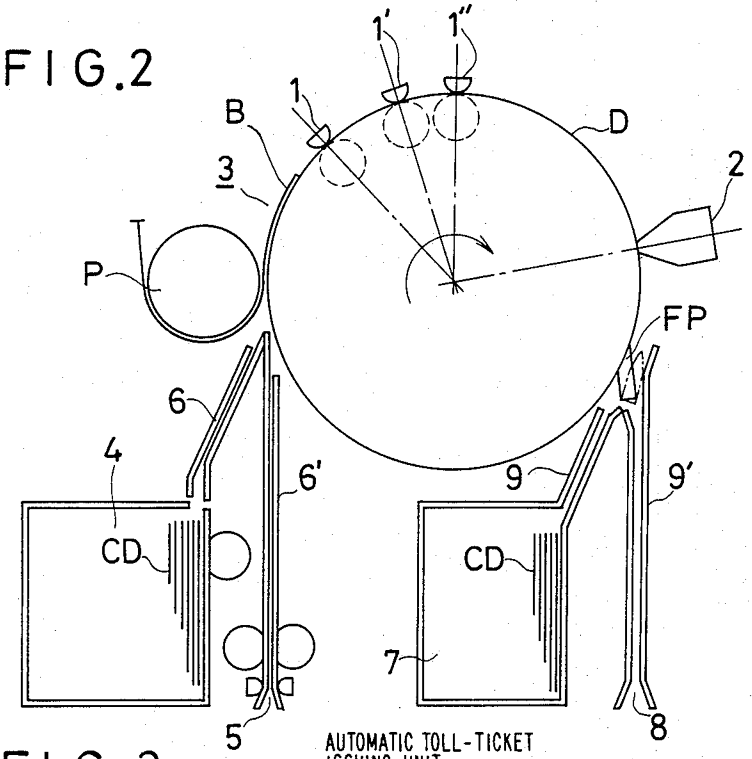
FIG. 2 is a schematic view illustrating the construction of a conventional toll-ticket issuing apparatus.
Figure 3:
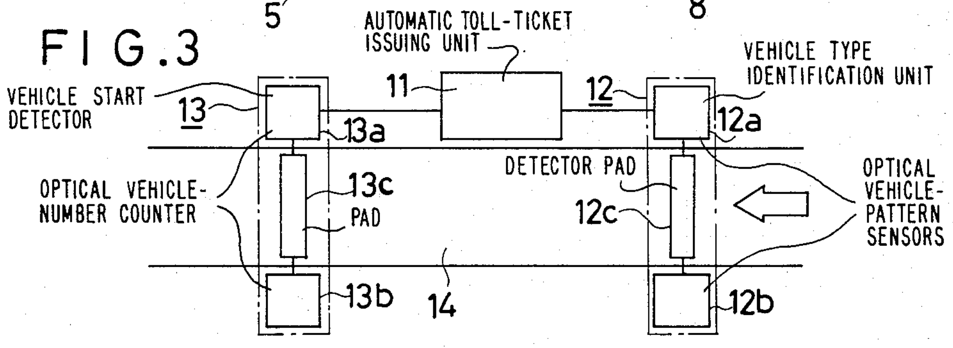
FIG. 3 is a plan view showing the construction of an apparatus according to the invention.
Figure 4:
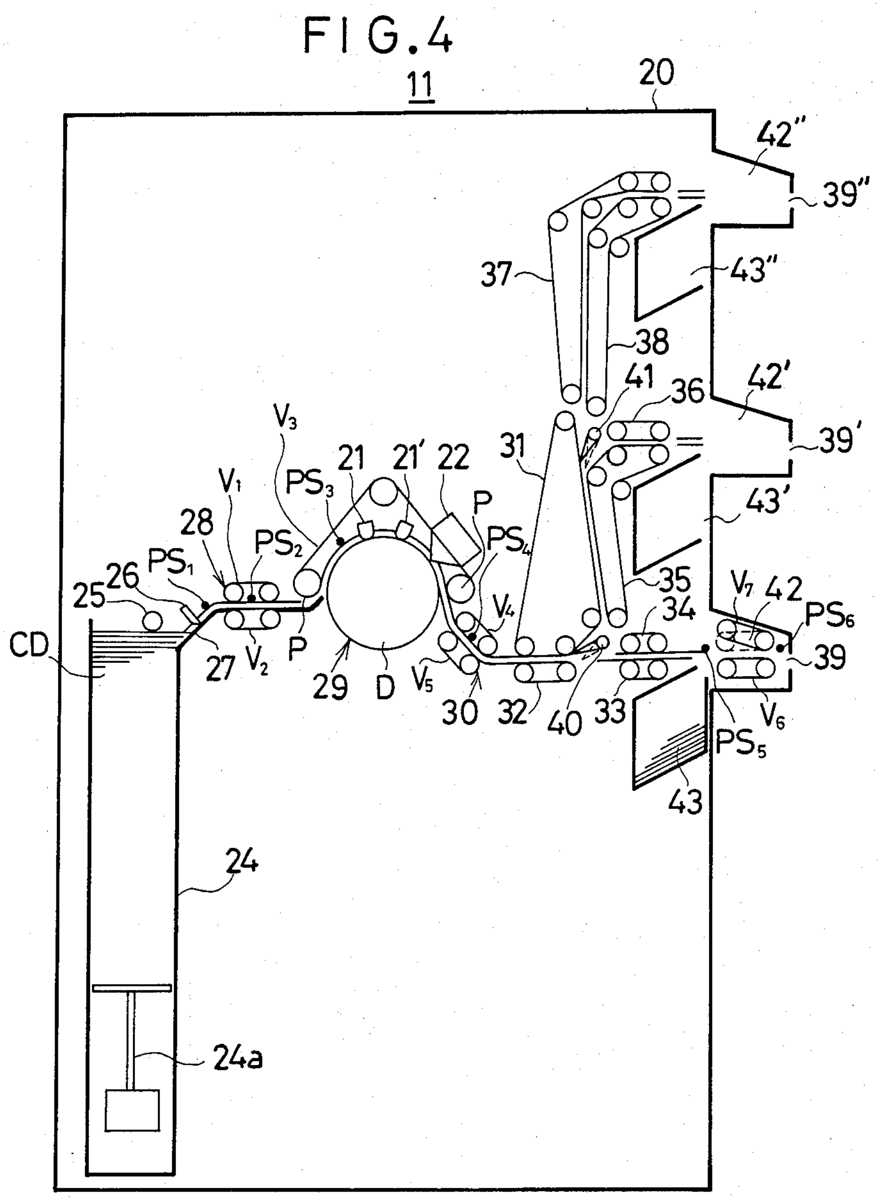
FIG. 4 is a schematic illustration of the construction of an apparatus embodying the invention.
Figure 5:
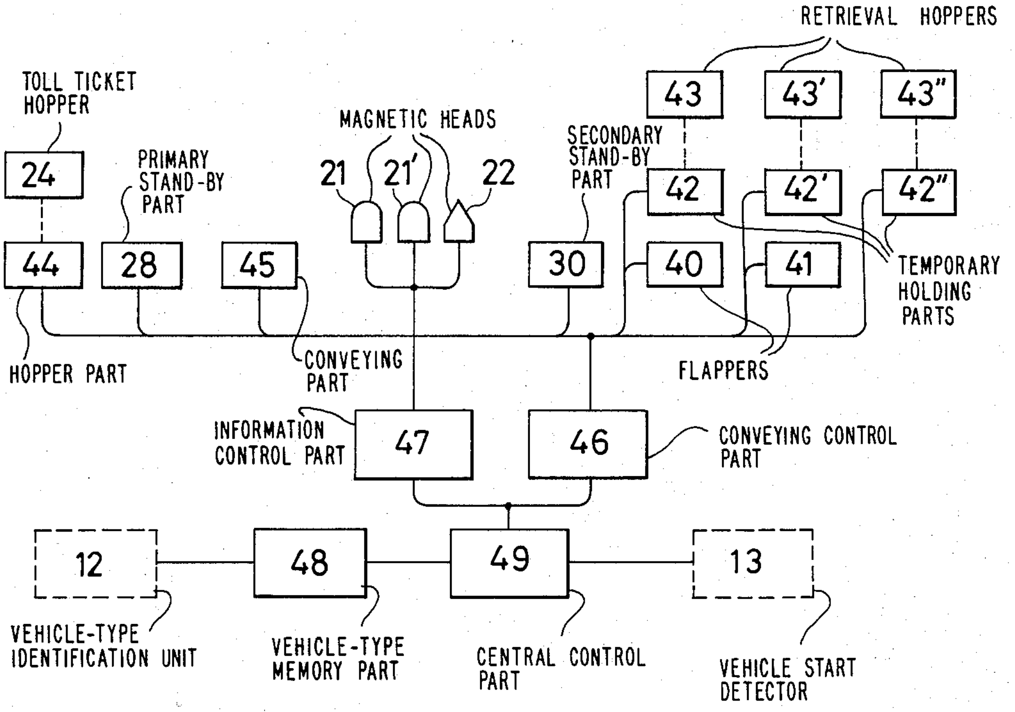
FIG. 5 is a block diagram representing the control circuitry of the apparatus shown in FIG. 4.

Referring now to FIGS. 3 to 5, an embodiment of the invention will be described below.

FIG. 3 illustrates a systematic arrangement of units constituting the apparatus of the invention. In the figure the numeral 11 designates an automatic toll-ticket issuing unit, 12 a vehicle-type identification unit, 13 a vehicle-start detector, and 14 a vehicle path.

The vehicle-type identification unit comprises a set of optical vehicle-pattern sensors 12*a*, 12*b* disposed in a spaced relation, for example, above islands provided along both sides of the entry part of the vehicle path 14 and which detect the vehicle pattern from the manner in which the vehicle crosses and shields a plurality of optical paths formed in a screen fashion between the sensors, and a detector pad 12*c* laid flush with the road surface below the optical paths and adapted to be actuated by the pressure of the vehicle passing over the pad to detect the numbers of axles and wheels, etc. of the vehicle.

With all the components installed before the toll-ticket issuing unit, the identification unit automatically identifies the type of the oncoming vehicle from the detected information and transmits the vehicle-type number to the issuing unit. It also detects any backward movement of the vehicle after arrival at the detection point.

Similarly, the vehicle-start detector 13 comprises a set of optical vehicle-number counters 13*a*, 13*b* disposed in a spaced relation, above islands along both sides of the vehicle path ahead of the toll-ticket issuing unit 11 and which count the number of vehicles passing in between, and a pad 13*c* laid flush with the road surface below the optical paths between the counters and adapted to be actuated by the pressure of the vehicle passing over it. The vehicle-start detector thus detects forward and backward movements of each vehicle and sends out the vehicle-start signal to the toll-ticket issuing unit 11.

The apparatus according to the invention, upon detection of a vehicle approaching the gate, automatically identifies the type of the vehicle and issues a toll ticket for the particular vehicle from one of a plurality of slots of varying heights, i.e., from the slot at a height corresponding to that vehicle. When the driver has pulled off the ticket and has started off, the apparatus urges the issuing unit to prepare another ticket for the next vehicle. When any driver has proceeded through the gate without picking up the ticket, the apparatus automatically retracts the ticket lest the driver of the following vehicle pull it off. If any driver who has taken his ticket drives his vehicle backward from an intermediate point in an attempt to obtain another ticket, the apparatus will retract and temporarily hold the ticket once issued for the next vehicle. Thus, according to the circumstances, the apparatus automatically performs the above controls and puts out toll tickets for the respective oncoming vehicles quickly and accurately from the slots at heights that provide easy access to the individual drivers.

In FIG. 4, which schematically illustrates the interior construction of the toll-ticket issuing unit 11, the numeral 20 indicates a housing and 24, a toll-ticket hopper which holds a stack of unused magnetic toll tickets CD. In the lower part of the ticket hopper 24 is installed a lift mechanism 24*a* for forcing the stack of toll tickets CD upward. In the upper part of the ticket hopper 24 is provided a feed roller 25 for feeding the tickets CD one by one out of the hopper.

The numeral 26 denotes a double-feed-preventing gate pawl of the well-known construction which, when the feed roller 25 has erroneously fed two or more toll tickets, separates them and feed one ticket at one time. The pawl is preset to a downward projection into the gap between itself and a guide 27 which serves as a guide plate for feeding the tickets so that the gap is broader than the thickness of each ticket but narrower than the combined thickness of two tickets and that only one ticket is fed at one time.

A primary standby mechanism 28 is provided to keep the toll ticket CD, fed out through the gate claw 26, in a standby position. As shown, it comprises a pair of endless belts $V_1$, $V_2$ each extended around a pair of pulley and located opposite each other so as to transport the ticket CD from the guide 27 toward the drum, by holding it between the belts $V_1$, $V_2$. The ticket is kept in the standby position or is forwarded by driving or stopping the pulleys with a motor not shown. The primary standby mechanism 28 is designed to feed a toll ticket CD to this point in advance and keep it in the standby position in order that the ensuing ticket may be processed at high speed.

The symbols $PS_1$, $PS_2$ stand for photosensors which optically detect the points through which the ticket CD passes, the sensor $PS_1$ serving to fix the stop position of the feed roller 25 and the sensor $PS_2$, the stop position of the primary standby mechanism 28.

A main conveying part 29 is provided on the downstream side of the primary standby mechanism 28. It comprises a generally disc-shaped conveying drum D and an endless belt $V_3$ extended around, and supported by, pulleys P in sliding contact with the circumference of the drum.

As the primary standby mechanism 28 is driven, the toll ticket CD is fed into the main conveying part, with its leading end gripped between the belt $V_3$ and the conveying drum D, and then the ticket is conveyed to a secondary standby mechanism 30 to be described later. The main conveying part 29 is normally kept running by a motor not shown.

Magnetic heads 21, 21′ for writing necessary information on, or reading it from, the magnetic recording zone (or magnetic stripe) MS of the toll ticket CD are installed close to the ticket-conveying path of the drum D in the main conveying part 29. Of the two heads, 21 is for writing only and 21′, for reading only. Pad rollers for pressing the magnetic recording zone MS of the toll ticket against the write and read heads 21, 21′ are not shown here.

A printer head 22 is provided for printing necessary information on the blank space SP, a printable zone of the toll ticket CD. In the embodiment being described, the printer head is located near the discharge end of the conveying drum D, which serves also as a platen or backing for printing. The symbol $PS_3$ stands for another photosensor located in the vicinity of the toll-ticket inlet of the conveying drum D so as to position each ticket for timed magnetic recording and printing.

A secondary standby mechanism 30 having the same functions as the primary standby mechanism 28 is provided at the outlet of the main conveying part 29. It comprises two conveying belts $V_4$, $V_5$ extended around pulleys and held close to each other to carry the toll ticket CD securely in between, a photosensor $PS_4$ for detecting the ticket, and a motor not shown for driving the two belts $V_4$, $V_5$. By means of the photosensor $PS_4$ it detects the ticket and fixes its secondary standby position, etc.

Other conveying belts 31 to 38 are supported by pulleys or the like to convey tickets. Slots 39, 39', 39'' are formed at different levels, low, middle, and high, respectively, to put out tickets selectively at suitable heights for the individual drivers to receive.

The conveying belt 31 extends from a point close to the outlet of the secondary standby mechanism 30 toward the low ticket-issuing slot 39 and up to a height on the same level with the middle ticket-issuing slot 39'. The conveying belt 31 is in contact with the other belts 32, 35, respectively, from the outlet of the secondary standby mechanism 30 toward the low ticket-issuing slot 39 and from the outlet end of the belt 32 as a branching point upward to a point close to the level of the middle ticket-issuing slot 39'.

At a point ahead of the outlet of the conveying path formed by the belts 31, 32, there is provided a shifting flapper 40 for changing over to alternative routes. When the flapper 40 closes the route along the conveying belt 31, the toll ticket CD being transported is directed to the terminal conveying route leading to the low ticket-issuing slot 39. Conversely when the flapper 40 opens the route along the belt 31, the ticket is guided by the flapper 40 toward the conveying belt 35 and then toward the middle and high ticket-issuing slots 39', 39''. The discharge end portion of the conveying belt 35 is bent toward the middle issuing slot or port 39', and the bent portion is held in parallel with the belt 36 to constitute a terminal conveying route to the middle ticket-issuing slot 39'.

At the branching point to this terminal conveying route is disposed a route-shifting flapper 41, which when closing the route along the conveying belt 31 causes the toll ticket to be shifted thereby toward the belt 36 providing that terminal conveying route, or when opening the route causes the ticket to proceed further to the route formed between the conveying belts 37 and 38.

The belts 37 and 38 cooperate to deliver the ticket from the belt 31 toward the high ticket-issuing slot 39''.

In the neighborhood of the low ticket-issuing slot 39, there is a terminal conveying route formed by the conveying belts 33, 34 that guide the ticket shifted in direction by the flapper 40. The three ticket-issuing slots 39, 39', 39'' are equipped, respectively, with mechanisms 42, 42', 42'' for temporarily holding a ticket at one time. Each of these temporary holding mechanisms 42, 42', 42'' comprises a pair of belts extended around pulley, etc. and arranged closely in parallel, and functions to grip each toll ticket between the belts and transport it toward the associated slot. Thus, the mechanisms have the functions of "ticket issuing", "temporary holding", and "storing" retrieved tickets in hoppers 43, 43', 43'' installed near the ticket-issuing slots 39, 39', 39'', respectively.

The conveying belts 31-38 are driven by motors not shown to run constantly during operation.

Next, the temporary holding mechanisms 42, 42', 42'' will be described in more detail. For simplicity, the lowermost mechanism 42, i.e., the one associated with the low ticket-issuing slot 39, is cited here for example, the description of the other two mechanisms being omitted because of similar construction and functions.

The temporary holding mechanism is composed of two conveying belts $V_6$, $V_7$ and photosensors $PS_5$, $PS_6$ arranged, respectively, close to the opposite ends of the belts. These conveying belts $V_6$, $V_7$ are separately driven by a motor not shown, independently of the conveying routes formed by the main conveying part 29 and by the conveying belts 31-38.

Unlike the primary and secondary standby mechanisms 28, 30, the temporary holding mechanism is reversely controllable. As shown, the conveying belt $V_7$ is shiftable in position, with respect to the center of the belt pulley closer to the ticket-issuing slot, to either open or close position indicated, respectively, by full or broken lines. While waiting for a toll ticket CD, the belt is stationary in the full-line "open" position. As a ticket is delivered by the conveying belts 33, 34 and the photosensor $PS_5$ (installed slightly inside the path between the belts $V_6$, $V_7$) detects it, the belt $V_7$ is shifted to the broken-line "closed" position. The belts $V_6$, $V_7$ are then driven forwardly to transport the ticket CD to and partly beyond the issuing slot 39.

The length of the ticket portion to be put out of the slot is controlled by the photosensor $PS_6$.

When retracting the ticket from this state, the belts $V_6$, $V_7$ in the closed position are driven back to a halt and holding position. With further reverse motion of the belts, the ticket CD is let fall into the hopper 43. The ticket is shifted in direction toward the passage leading to the hopper as the belt $V_7$ is forced down slightly beyond the broken-line position.

In addition to the aforedescribed function, the photosensors $PS_6$ and $PS_5$, arranged in tandem along the direction in which the toll ticket CD proceeds, detect the "pull-off" of the ticket by a driver or "pull-back" into the apparatus from the timing of their own switching.

The control circuitry for the toll-ticket issuing unit 11 will now be explained with reference to FIG. 5. Numerals like those used in FIG. 4 indicate like parts.

In the circuit diagram: 44 is the hopper part composed of the abovementioned feed roller 25 and other components of the toll-ticket hopper 24; 28 is the primary standby part comprising the conveying belts $V_1$, $V_2$ and photosensors $PS_1$, $PS_2$; 45 is the conveying part comprising the main conveying part, conveying belts 31-38, and photosensor $PS_3$; 30 is the secondary standby part comprising the conveying belts $V_4$, $V_5$ and photosensor $PS_4$; 40, 41 are the flappers; 42, 42', 42'' are temporary holding parts provided, respectively, for the toll-ticket issuing slots 39, 39', 39'' at low, middle, and high levels; 46 is the conveying control part for primarily controlling the system for conveying the toll tickets; 47 is an information control part for primarily controlling the magnetic recording and printing on the tickets; 48 is a vehicle-type memory part for memorizing the vehicle-type signals transmitted from the vehicle-type identification unit 12 in the order of arrival at the gate; and 49 is a central control part connected with the conveying control part 46, information control part 47, vehicle-type memory part 48, and vehicle-start detector 13 to control the transmission of signals among those parts and make logical decisions.

The operation of the apparatus according to the invention is as explained below. In the first place, the start-stop timing of the feed roller 25, primary and secondary standby mechanisms 28, 30, and temporary holding mechanisms 42, 42', 42'' will be clarified.

The feed roller 25, primary standby mechanism 28, and secondary standby mechanism 30 are driven upon receipt of coded vehicle-type signals from the vehicle-type memory part 48. For stopping, the feed roller 25 is brought to a stop by the photosensor $PS_1$, the primary standby mechanism 28 by a rise-up delay signal from the photosensor $PS_2$, and the secondary standby mechanism 30 by a rise-up delay signal from the photosensor $PS_4$.

In the temporary holding part 42, the output from the photosensor $PS_5$ closes the conveying belt $V_7$ and drives the belt $V_5$, $V_7$.

Toll ticket issuing is stopped by a rise-up delay signal from the photosensor $PS_6$. Temporary hold and storing of the toll ticket are accomplished by reversing the runs of the conveying belts $V_6$, $V_7$ under the control of the central control part 49 and by a rise-down delay signal from the photosensor $PS_6$. The delay signals so far described are controlled by built-in timers and output from the central control part 49.

Now, the operation of the present apparatus in response to the approach of vehicles will be explained. First, by way of example, it is assumed that a single vehicle instead of a bunch is oncoming.

As the vehicle enters the invisible screen of the vehicle-type identification unit 12, the latter automatically identifies the type of the particular vehicle and allows the vehicle-type memory part to memorize it. At the same time, the identification unit transmits a vehicle-type signal to the central control part 49, which in turn immediately instructs the conveying control part 46 and the information control part 47 to issue a toll ticket.

In response to the instruction, the conveying control part 46 drives the feed roller 25 and causes it to a feed a toll ticket CD from the hopper 24. Since the primary standby mechanism 28 is also driven, the ticket so fed out is led through the gate claw 26 into the normally-running main conveying part 29. If two tickets are erroneously fed, the gate claw 26 will allow only one to pass.

The other ticket enters the primary standby mechanism 28, and the photosensor $PS_2$ detects it and automatically stops the ticket upon the rise-up of its output. Meanwhile, the preceding ticket that has been held by the primary standby mechanism 28 is urged into the main conveying part 29. As the photosensor $PS_3$ detects the leading end of the ticket, the signal is transmitted to the central control part 49.

Upon arrival of the ticket-end signal from the photosensor $PS_3$, the central control unit 49 transmits the preset signals representing the vehicle type, tollgate No., date and time of passage, etc. to the information control part 47. The latter then drives the write head 21 to record these pieces of information in timed relation to the recording position of the magnetic recording zone MS of the toll ticket. The recorded information is read and checked by the read head 21' as the ticket is conveyed past the head. If the information has been properly recorded magnetically, the necessary data, similar to the magnetically recorded information, are printed on the printable zone SP by the printer head 22.

The printed toll ticket is transported along the conveying drum D into the already running secondary standby mechanism 30. As soon as the ticket arrives at the photosensor $PS_4$, the latter detects it and gives a detection signal to the conveying control part 46. The control part 46, in turn, transmits an inquiry into the central control part 49 to see if any previously issued ticket is present in the temporary holding mechanism 42, 42', or 42'' of if a vehicle carrying a toll ticket already pulled off is gone. When there is no previously issued ticket inside and when the vehicle with the ticket is gone, the secondary standby mechanism 30 is driven through the conveying control part 46 to carry the ticket into the path between the conveying belts 31 and 32.

As noted above, the secondary standby mechanism 30 stops automatically upon detection of the rise-down of output of the photosensor $PS_4$.

Simultaneously, the conveying control part 46 drives the feed roller 25 and the primary standby mechanism 28 again to feed the next toll ticket to the primary standby position.

The ticket forced into the path between the conveying belts 31 and 32 is then transmitted to the temporary holding mechanism 42, 42', or 42'' corresponding to the type of the particular vehicle, under the control of the flapper 40 and/or 41, since the slot through which the ticket is issued is already known from the type of the vehicle. For example, if the vehicle is an ordinary passenger car, then the ticket is sent to the temporary holding mechanism 42 associated with the low ticket-issuing slot 39 at the low level closest to the car's driver seat. The photosensor $PS_5$ of the temporary holding mechanism 42 then detects the arrival of the ticket, and, under the control of the conveying control part 46, the belt $V_7$ is set to the "closed" position to grip the ticket between itself and the other belt $V_6$ of the temporary holding mechanism 42 and thereby deliver the ticket to the issuing slot 39. The length of the ticket portion to be so delivered and exposed beyond the slot is controlled by means of the timer in the central control part 49 in response to the signal from the photosensor $PS_6$.

When the toll ticket thus issued has been pulled off, the photosensor $PS_6$ detects it so that the central control part 49 can prepare for issuing a new toll ticket.

Next, the operation in the case where another vehicle enters the tollgate zone while the toll ticket is being issued for the preceding vehicle will be explained.

In the arrangement of FIG. 3, it is assumed that the vehicle-type identification unit 12 and the toll-ticket issuing unit 11 are kept apart a sufficient distance to accommodate a plurality of vehicles in between. Then, the vehicle-type memory part 48 automatically memorizes the vehicle-type information from the vehicle-type identification unit 12 in the order of arrival of the vehicles. Upon receipt of the vehicle-type signal for each following vehicle, the central control part 49 locates by itself the point where the toll ticket for the preceding vehicle is being transported inside the apparatus. Where the secondary standby mechanism 30 is "empty" (with the output of the photosensor $PS_4$ "L") and where there is no ticket in transit in the main conveying part 29, a toll ticket normally standing by in the primary standby mechanism 28 is moved ahead to the second standby mechanism 30. During this advance of the ticket, necessary information is recorded and checked in the main conveying part 29.

Where the secondary standby mechanism 30 is "full" (with the output of the photosensor $PS_4$ "H"), the ticket waits as memorized in the vehicle-type memory part 48. After the toll ticket for the preceding vehicle has been pulled off and the vehicle has normally "started" or any unpulled ticket has been "retrieved" into the hopper 43, 43', or 43'' or after the process for the preceding vehicle has been concluded, the ticket in the secondary standby position is urged forward, resuming its travel toward the issuing slot. At the same time, the memorized information on the type of the preceding vehicle is cleared, and the vehicle-type memory part 48 shifts the memory contents one step forward and transmits the memorized information on the next vehicle to the central control part 49. Given a signal indicating the start of the preceding vehicle from the vehicle-start detector 13, the central control part 49 will confirm it, clear the related information from the vehicle-type memory part 48, and all the controls are reset to stand by for the ensuing vehicle.

If any vehicle forces its way through the tollgate without the toll ticket issued for it, the central control part 49 detects the residual ticket in the temporary holding mechanism 42 at the point the vehicle-start detector 13 has received a start signal. The control part thus determines that the ticket has been left unpulled, and causes the conveying control part 46 to reverse the running of the temporary holding mechanism 42 and retrieve the ticket into the hopper 43. The retrieval is detected by the rise-down of output from the photosensor $PS_6$, and the vehicle-type memory part 48 is reset and otherwise the apparatus is brought back to the original state.

If a vehicle, once moved across the invisible screen of the vehicle-type identification unit 12, has been moved backward, the toll ticket once issued is retrieved by the temporary holding mechanism 42 into the hopper 43, in the same manner as above described. If any error in recording has been found in the course of reading and checking by the read head 21, the ticket is once sent to the temporary holding mechanism of the nearest ticket-issuing slot and then retrieved into the hopper. At the same time, the next ticket in the primary standby mechanism is transported to the secondary standby mechanism 30 to issue the new ticket.

If an error in magnetic recording is found in the ensuing toll ticket to be held in the secondary standby position, the central control part 49 inspects by itself the photosensors in the empty temporary holding mechanisms, examines their signal conditions, chooses an unoccupied and the nearest temporary holding mechanism, and causes the ticket to be transported to that mechanism again for subsequent retrieval into the hopper (43, 43', or 43"). These processing steps are taken in parallel with the ticket-issuing process for the preceding vehicle.

Should the preceding vehicle start without the driver pulling off the toll ticket for it, as was the case already explained in which but a single vehicle did so, the central control part 49 would detect the vehicle start, confirms the retrieval of the unused ticket (with the rise-down of output of the photosensor $PS_6$), and proceeds with steps for issuing a new ticket for the following vehicle (including feeding to the secondary and primary standby mechanisms and shifting of memory contents in the vehicle-type memory part 48, etc.).

Next, the case in which the driver of the preceding has pulled off his toll ticket, normally started forward, and then driven the vehicle backward will be considered.

While the vehicle is running reversely, the toll ticket for the following vehicle is already exposed at, or on its way toward, the ticket-issuing slot at the height corresponding to the type of the particular vehicle. Immediately upon receipt of a reversing signal from the vehicle-start detector 13, the central control part 49 recognizes the condition and, when the ticket is already exposed from the slot, drives the temporary holding mechanism reversely to retract the ticket to the inside of the slot, and allows the ticket to be issued again only after the previous vehicle has started forward.

This precludes the possibility of the driver of the preceding vehicle snatching away the ticket for the following vehicle.

When a vehicle that once proceeded into the invisible screen of the vehicle-type identification unit 12 has receded with the view to shifting lanes or for another reason, the vehicle-type information for the vehicle is erased by clearing the vehicle-type information last stored in the vehicle-type memory part 48, in response to a reversing signal from the vehicle-type identification unit 12.

In addition to the above-described functions, the central control part 49 is capable of detecting any jamming of toll tickets from the output conditions of the respective photosensors $PS_1$-$PS_6$ and performing timer control on the basis of the timing of those sensors. Other functions include automatic monitoring of the temporary holding mechanisms 42, 42', 42", shifting from a ticket-issuing slot with a holding mechanism out of order to a slot with a sound mechanism, and giving an alarm when necessary. Also, while the illustration or description is omitted here, the central control part can readily be connected operatively with signal lights, crossing gates, and other aids to guide and instruct drivers when to start and stop their vehicles.

As described above, the automatic toll-ticket issuing apparatus according to this invention comprises an issuing unit which cooperates with an automatic vehicle-type identification unit to issue toll tickets without human assistance, and uses a single magnetic recording and printing unit combined with selectable multistage conveying routes, so that toll tickets are automatically conveyed and issued at a plurality of issuing slots of different heights, each ticket at the slot at the optimum level for the type of the particular vessel for the convenience of the user. Moreover, a vehicle-start detector is operatively connected with temporary holding mechanisms provided at the ticket-issuing slots under control such that proper toll tickets can be issued to individual vehicles, preventing the driver of a preceding vehicle from pulling off the ticket for the following vehicle, too, and, even when the preceding vehicle has started leaving its ticket unpulled at the slot, preventing the driver of the ensuing vehicle from erroneously obtaining the ticket for the preceding vehicle. Further, primary and secondary standby mechanisms are provided to make a new toll ticket ready and also hold another ticket for the following vehicle in a standby position. This advantageously saves the issuing time and permits high-speed ticket issuing, particularly on jammed turnpike entrances and exits.

While the construction and functions of the single secondary standby mechanism 30, installed on the downstream side of the magnetic recording and printing part, have so far been described in detail, it is alternatively possible to provide similar mechanisms, one for each, immediately before the temporary holding mechanisms 42, 42', 42" for even higher speed ticketing.

Figure 6:
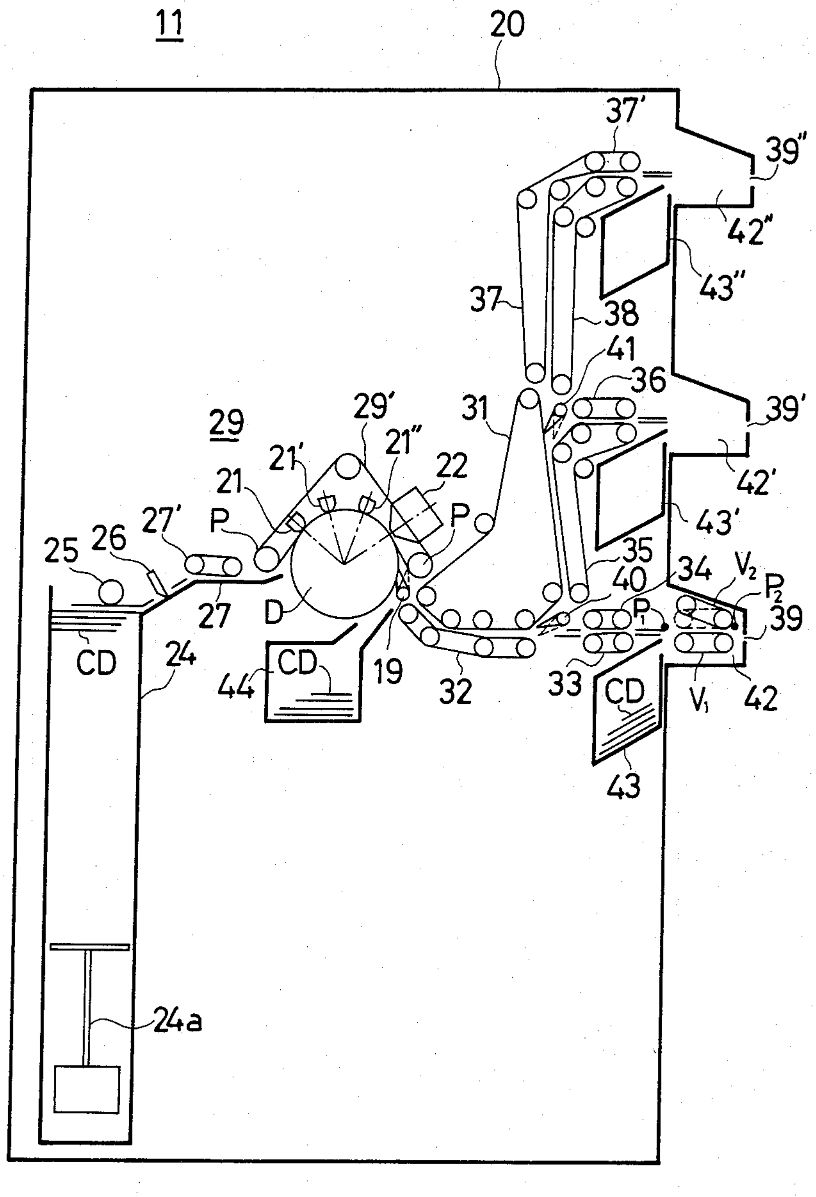
FIG. 6 is a schematic illustration of the construction of another embodiment of the invention.
Figure 7:
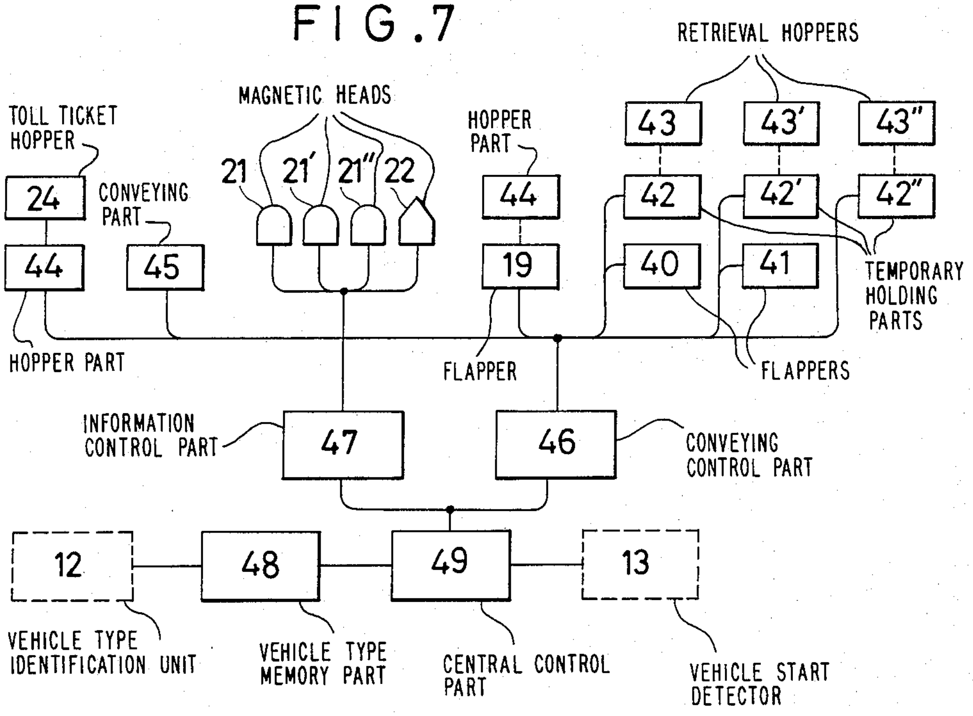
FIG. 7 is a block diagram of the control circuitry of the apparatus shown in FIG. 6.

FIGS. 6 and 7 illustrate another embodiment of the invention, in which the reference numerals like those used in FIGS. 4 and 5 designate like parts.

This embodiment differs from the one shown in FIGS. 4 and 5 in the following points. (1) The primary standby mechanism 28 and the secondary standby mechanism 30 are omitted. (2) An additional read head 21" is installed. (3) An additional flapper 19 and an associated hopper 44 are provided. (4) Conveying belts 31, 32 are extended to points adjacent to the flapper 19.

(5) The functions of the conveying control part 46, information control part 47, vehicle-type memory part 48, and central control part 49 are expanded.

The operation of the second embodiment is as follows.

As a vehicle enters the invisible screen of the vehicle-type identification unit 12, the latter automatically identifies the type of the vehicle from the numbers of wheels and axles, vehicle pattern, and other detected information, and transmits the information to the vehicle-type memory part 48. The latter, in turn, stores the information in the memory and also transfers it to the central control part 49. This permits the control part 49 instantaneously to output an instruction for issuing a toll ticket.

In response to this instruction, the conveying control part 46 works. It gives a control output, which drives the roller 25 so as to feed a toll ticket CD out of the hopper 24. The ticket is then transported to the drum conveying part 29 through the normally running conveying belt mechanism 27'. While the ticket CD is being conveyed by the drum, its magnetic stripe MS comes in contact with the read head 21, which reads the recorded data and transmits the data to the central control part 49 through the information control part 47, to make certain that the ticket is a new, unused one. As the ticket then passes in sliding contact with the write head 21', the central control part 49 reads the vehicle-type information of the particular vehicle from the vehicle-type memory part 48 and instructs the information control part 47 to record the information, together with the particular entrance tollgate number, date and time of passage, etc., on the magnetic stripe MS of the toll ticket CD, and the magnetic recording is effected. As the ticket further moves past the read head 21'', the recorded contents in the magnetic stripe MS are read by the head 21'' and transmitted via the information control part 47 to the central control part 49, where they are checked for accuracy. If the record is found correct, then the central control part 49 instructs the information control part 47 to print the necessary information like the information previously recorded magnetically. Thus, while the toll ticket CD is conveyed past the printer head 22, the necessary information is recorded on the space SP reserved for printing. When the series of recording steps and the check of the contents have been properly accomplished, the central control part 49 controls the conveying control part 46 so that the flapper 19 can switch over the conveying route to the route defined by the conveying belts 31, 32. The printed ticket is consequently led to the route between the belts 31 and 32.

If the reading by the read head 21 has revealed that the toll ticket is a used one or if the reading by the read head 21'' has revealed some error in the recorded contents, the fact is printed on the printable zone or space SP of the ticket. Whichever the case, the flapper 19 chooses a conveying route toward the stacker 44, and the ticket is dropped into the stacker.

The writing, reading, read-after-write, check, and printing of the magnetically recorded information are controlled by the information control part 47, in the manner described above, in response to the signals from the vehicle-type memory part 48 and the central control part 49 and also to the signals and ticket location signals from the conveying control part 46.

The toll ticket CD led into the route between the conveying belts 31 and 32 is guided by the flapper 40 to a conveying route chosen according to the type of the vehicle, and is transported through the route to the chosen ticket-issuing slot.

The ticket-issuing slots of the embodiment being described are provided at three different levels, low, middle, and high. The slot 39 at the low level is suited for small-size vehicles, the middle slot 39' for medium-size vehicles, and the slot 39'' for large-size vehicles, in each case giving the individual drivers easy access to their toll tickets. For this purpose the sizes of the vehicles are considered in terms of shapes or heights of the vehicles and need not always correspond to the types of vehicles as classified from the standpoint of the toll system.

The ticket-issuing slots being provided in such an arrangement, the flappers 40, 41 are shifted properly to choose the conveying route and transport the ticket to the slot at the optimum height in conformity with the relevant information stored in the vehicle-type memory part 48. This control is performed by the conveying control part 46 under the command from the central control part 49 based on the records stored in the vehicle-type memory part 48.

Controlled in this way, the flapper 40 remains in the full-line position when the ticket is to be issued for a small car, and the ticket CD is conveyed by the belts 33, 34 toward the temporary holding mechanism 42. For bigger cars the flapper 40 is shifted to the broken-line position to guide the ticket CD into the path between the conveying belts 31 and 35. The ticket is conducted upward to the flapper 41, which again chooses the further route for the ticket.

When the vehicle to be ticketed is of a medium size, the flapper 41 is kept in the full-line position and the ticket is sent to the conveying belts 35, 36 and thence to the temporary holding mechanism 42' associated with the middle issuing slot 39''. For a large vehicle the flapper 41 is shifted to the broken-line position so that the ticket can be conveyed further upward by the belts 37, 37', 38 into the temporary holding mechanism 42'' associated with the high issuing slot 39''.

Inside the temporary holding mechanism 42, the toll ticket CD is forced toward the issuing slot 39 and is stopped with a certain length portion exposed to the outside beyond the slot. This is effected as the conveying belt $V_2$ is shifted to the broken-line "closing" position and driven forwardly under the control of the conveying control part 46 actuated by a rise-up signal from the photosensor $P_1$ that has detected the particular ticket.

As soon as the toll ticket CD thus issued is pulled off by the driver, it is detected by the photosensor $P_2$ and its detection output is transmitted to the central control part 49 to notify the latter of the "pull-off". The vehicle-start detector 13, upon detection of the start of the vehicle past it, transmits the "start" signal to the central control part 49. At this point, the central control part 49 resets its memory that stored the "pull-off" information and clears the vehicle-type memory part 48 of the vehicle-type signal of the particular vehicle so as to be ready for the next vehicle. Where the information on the following vehicle is already stored in the vehicle-type memory part 48, it reads the information and immediately proceeds with the next ticket-issuing run. The runs for the middle and high issuing slots are likewise performed according to the vehicle types.

The toll ticket for the immediately following vehicle is not issued until the driver of the preceding vehicle has pulled off his ticket and has the start of his vehicle detected. This avoids the preceding driver from snatching away the ticket for the ensuing vehicle.

Next, unusual movements of vehicles at the tollgate will be considered.

One of the unusual actions for drivers is forcing their way through the gate without any toll ticket. In passing the gate, some drivers do not pull off their toll tickets already exposed partly from the slots.

If the driver of the following vehicle pulls off such a ticket CD left unpulled by the preceding driver, a confusion will occur in the system. It is therefore necessary to pull back and retrieve the ticket automatically. In such a case, the vehicle-start detector 13 transmits the vehicle-start signal to the central control part 49 before the arrival of the signal indicating the pull-off of the toll ticket CD once issued. This tells instantly that the preceding vehicle has proceeded past the gate without the toll ticket. The central control part 49 then gives an instruction for "retrieval" to the conveying control part 46 and causes the part to retrieve the card into the hopper.

It is now assumed that a toll ticket already issued at the low issuing slot 39 has been left unpulled by a driver. Then, in order to retrieve the ticket into the hopper 43, the conveying control part 46 drives the belts $V_1$, $V_2$ of the temporary holding mechanism 42 of the slot 39 reversely. Since the rear supported end portion of the ticket partly exposed through the slot is held between the belt $V_2$ in the broken-line position and the belt $V_1$, reversing of the belts $V_1$, $V_2$ will carry the ticket into the hopper 43 for retrieval provided the entrance of the passage between these belts is slightly inclined downward to face the hopper inlet.

The reverse motion of the ticket on its way for recovery is detected by the photosensor $P_2$ of the temporary holding mechanism 42, and a photosensor installed inside the hopper 43 but not shown confirms the retrieval and transmits the information to the central control part 49. Thereupon, the central control part 49 instructs the conveying control part 46 so as to stop the belts $V_1$, $V_2$ of the temporary holding mechanism 42 and reset the belt $V_2$ to the initial condition (full-line position) to be ready for the next vehicle or ticket issuing.

Another example of unusual driver conducts is the backing of the vehicle.

First, the case in which the vehicle normally starts forward and then backs to the toll-ticket issuing unit 11. Because the advance of the vehicle following the normal pull-off of the toll ticket CD has already enabled the vehicle-start detector to output the vehicle-start signal, the vehicle-type memory part 48 is devoid of the information on the backing vehicle. When the next vehicle is standing by or has begun entering the gate, the apparatus is going to issue, or has already issued a ticket for that vehicle.

In the former case, where the vehicle-type memory part 48 is cleared of the information on the preceding vehicle, the central control part 49 receives the signal from the vehicle-type identification unit 12 but controls the operation to hold the ticket issuing for the next vehicle until the backing signal from the vehicle-start detector 13 is cleared of again by a vehicle-start signal.

In the latter case, when the toll ticket is on a conveying belt, the central control part 49 transmits an instruction to the conveying control part 46 to hold the ticket temporarily in the temporary holding mechanism 42. If the ticket is already at the issuing slot, partly exposed to the outside, it is retracted into the temporary holding mechanism 42 and is caused to stand by there. In the same way as in the former case, the temporary holding mechanism 42 is driven forward to issue the ticket for the following vehicle at the issuing port as soon as the "backing signal" from the vehicle-start detector 13 is cleared of by the input of another "vehicle-start signal".

While the operations in unusual cases have been explained primarily in connection with the ticket-issuing slot at the low level, it should be obvious to those skilled in the art that the same applies to the other ticket-issuing slots at the higher levels.

Still another possibility is the backward movement of a vehicle that has once entered the sensing field of the vehicle-type identification unit 12. Here again there will be two possible cases, i.e., with or without the presence of an immediately preceding vehicle.

In the absence of any preceding vehicle, the information as to the identified type of the oncoming vehicle is input to and stored in the vehicle-type memory part 48. As the information is read out and given to the central control part 49, the latter immediately outputs a ticket-issuing instruction and the apparatus proceeds with steps for ticket issuing. However, as soon as the backing of the vehicle is detected by the vehicle-type identification unit 12, the central control part 49 transmits an instruction to the conveying control part 46 for retrieval of the ticket. Then, as in the afore-described case with the backing of the preceding vehicle, the ticket is retrieved into the hopper 43 via the temporary holding mechanism. The central control part 49 confirms the holding of the ticket in the hopper by means of a photosensor not shown and urges issuing of the ticket for the following vehicle.

When the information on a plurality of preceding vehicles is stored in the vehicle-type memory part 48, the vehicle type data are memorized in the order of arrival at the gate. In that case, it is only necessary to clear the information on the last vehicle first.

This clearing is accomplished upon receipt of the "backing signal" output from the vehicle-type identification unit 12 at the time it detects the backing of the particular vehicle.

It is to be understood that this invention is not in any way limited to the embodiments herein described and illustrated but may be otherwise variously embodied without departing from the spirit and scope of the invention.

We claim:

1. An automatic toll-ticket issuing apparatus for location along a path of movement of vehicles in the forward direction comprises a vehicle-type identification unit for identifying the type of each oncoming vehicle, a toll-ticket issuing unit installed downstream along the vehicle path of movement from the identification unit, and a vehicle-start detector installed downstream along the vehicle path of movement from the issuing unit, said toll-ticket issuing unit comprising a plurality of toll-ticket issuing slots open at different heights, means for holding a stack of new, unused toll tickets including a hopper, means for feeding the tickets one by one out of the hopper, means for recording the vehicle-type information, interchange number, and other necessary information on each ticket being fed, conveying means for sequentially transporting recorded tickets, each to an issuing slot at the height determined in response to the vehicle-type information from the vehicle-type identification unit, and means for retrieving and storing any ticket left unpulled from any issuing slot by any driver, in response to vehicle passage information.

2. An apparatus according to claim 1, in which said toll-ticket issuing unit further comprises a primary standby mechanism for temporarily holding each of the toll tickets being fed, in succession, from said means holding new, unused tickets, and a secondary standby mechanism for temporarily holding a recorded ticket.

3. An automatic toll-ticket issuing apparatus for location along a path of movement of vehicles in the forward direction comprises a vehicle-type identification unit for identifying the type of each oncoming vehicle, a toll-ticket issuing unit installed downstream along the vehicle path of movement from said identification unit, and a vehicle-start detector installed downstream along the vehicle path of movement from said issuing unit, said toll-ticket issuing unit comprising a plurality of toll-ticket issuing slots open at different heights, means for holding a stack of new, unused toll tickets including a hopper, means for feeding the tickets one by one out of the hopper, means for recording the vehicle-type information, interchange number, and other necessary information on each ticket being fed, means for retrieving tickets with errors recorded thereon or with other defects, conveying means for sequentially tansporting recorded tickets, each to an issuing slot at the height determined in response to the vehicle-type information from the vehicle-type identification unit, and means for retrieving and storing any ticket left unpulled from any issuing slot by any driver, in response to vehicle passage information.

4. An apparatus according to claim 1 or 3, in which, adjacent to each ticket-issuing slot, there is provided a temporary holding mechanism for temporarily holding the ticket conveyed thereto.

5. An apparatus according to any of claims 1 2 or 3, in which said toll-ticket issuing unit further comprises a control system for controlling said means and mechanisms, said control system in turn comprising a vehicle-type memory part for storing the vehicle-type signals transmitted from said vehicle-type identification unit in the order of arrival of the vehicles, a conveying control part for primarily controlling the system for conveying the tickets, an information control part for primarily controlling magnetic recording and printing of the tickets, and a central control part connected with said vehicle-type memory part, conveying control part, information control part, and vehicle-start detector to control the transmission and receipt of signals among said parts and make logical decisions.

6. An apparatus according to claim 4, in which said toll-ticket issuing unit further comprises a control system for controlling said means and mechanisms, said control system in turn comprising a vehicle-type memory part for storing the vehicle-type signals transmitted from said vehicle-type identification unit in the order of arrival of the vehicles, a conveying control part for primarily controlling the system for conveying the tickets, an information control part for primarily controlling magnetic recording and printing of the tickets, and a central control part connected with said vehicle-type memory part, conveying control part, information control part, and vehicle-start detector to control the transmission and receipt of signals among said parts and make logical decisions.

* * * * *